Feb. 6, 1951     S. G. OSBORNE     2,540,960
ELECTROLYTIC CELL

Filed June 3, 1946     4 Sheets-Sheet 1

INVENTOR.
Sidney G. Osborne
BY

INVENTOR.
Sidney G. Osborne
BY
Robert A. Lavender

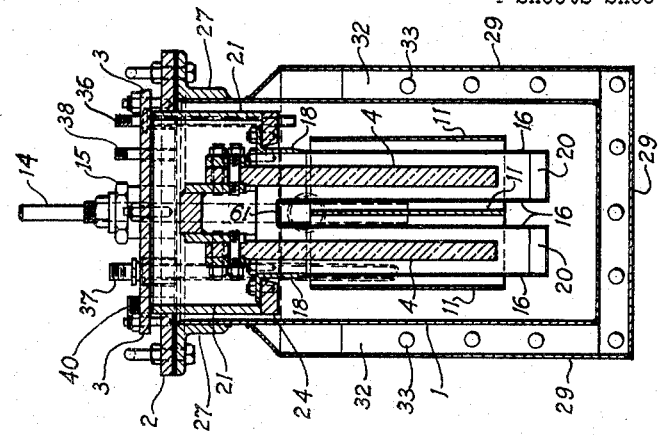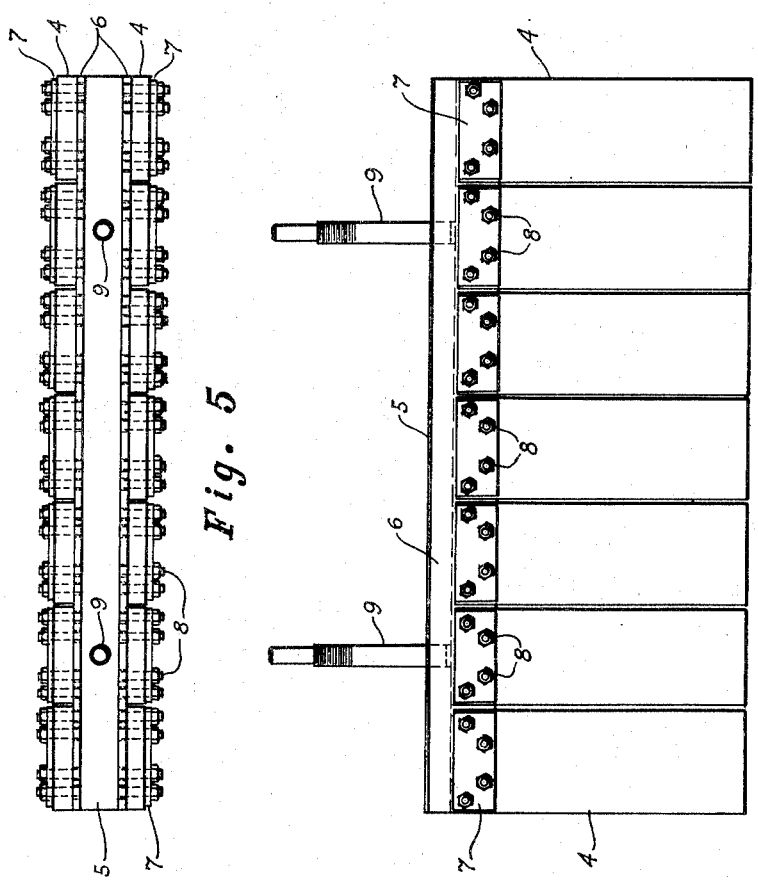

Feb. 6, 1951 S. G. OSBORNE 2,540,960
ELECTROLYTIC CELL
Filed June 3, 1946 4 Sheets-Sheet 4

INVENTOR.
Sidney G. Osborne
BY
Robert A. Lavender

Patented Feb. 6, 1951

2,540,960

UNITED STATES PATENT OFFICE 2,540,960

ELECTROLYTIC CELL

Sidney G. Osborne, Niagara Falls, N. Y., assignor to the United States of America as represented by the United States Atomic Energy Commission Application June 3, 1946, Serial No. 673,938

2 Claims. (Cl. 204—247)

The present invention relates to electrolytic cells and, more particularly, to electrolytic cells for production of elemental fluorine from hydrogen fluoride.

An electrolytic cell designed for such production is described in application S. N. 526,634, filed March 15, 1944.

It is known that anhydrous hydrogen fluoride forms complexes with anhydrous alkali metal fluorides of the group consisting of sodium, potassium and lithium fluorides, which complexes have the general formula $RF \cdot nHF$, wherein R is an alkali metal and $n$ is an integer up to and including 4. The melting points of these complexes range from those of the salts themselves to temperatures below ambient atmospheric temperatures, the complexes therefore being normally solid or liquid.

When these liquid or molten complexes are electrolyzed, fluorine collects at the anode and hydrogen at the cathode, leaving the salt unaffected. The HF can be replaced during the electrolysis, either continuously or intermittently. Thus the salt acts as a convenient absorbent and vehicle for electrolysis of the hydrogen fluoride in liquid phase.

For this purpose the complexes formed with potassium salt, having the formula $KF \cdot nHF$, are generally preferred. The melting points and vapor pressures of these complexes have been studied by other investigators, and graphs of melting points have been published showing several sharp downward cusps, corresponding to eutectics. One of these has a composition of KFHF or $KHF_2$ and a melting point of about 235° C. Another has a composition of approximately $KF \cdot 1.9HF$ and a practical melting point of about 85° C. These are naturally favorable for electrolytic decomposition of the hydrogen fluoride. The vapor pressure of hydrogen fluoride from decomposition of these complexes at or above their melting points is in general such that the electrolytic decomposition products tend to be considerably diluted with hydrogen fluoride. However, in the case of the eutectics, and in particular in the case of the composition of the formula $KF \cdot 1.9HF$, the dilution is comparatively slight.

Elemental fluorine attacks all metals; however, the fluorides of many metals, including several of the commonest, such as iron and copper, are substantially insoluble in the above-described electrolytes and form films over the metals which are very persistent under electrolytically neutral conditions and even quite persistent under anodic conditions. Under cathodic conditions, the hydrogen, of course, protects the metal. These films are of high electrical resistance or are non-conducting and render such metals unfit for use as anodes, but they do not necessarily prevent their use for the purpose of electrical connections to the anodes. While not perfectly resistant in such connections, under certain conditions such metals as iron and copper are sufficiently resistant to be practicable for this purpose.

A notable exception to the metals, with respect to their general behavior toward fluorine, is nickel. In the electrolyte the fluoride of nickel does not form a protective film over the metal. This renders possible the use of nickel anodes in electrolytic hydrogen-fluorine cells. However, the attack on the nickel is extremely vigorous and the electrolyte becomes quickly contaminated with nickel fluoride. Frequent cleaning of the electrolyte is therefore necessary and the cost of the nickel is a large item of expense.

Carbon does not afford as simple a solution of the problem of providing a practicable anode material for fluorine cells as it does in the case of chlorine cells. Carbon of different grades, graphitized and ungraphitized, behaves differently with respect to a given electrolyte, and carbon of a given grade behaves differently with respect to different electrolytes; also, a carbon of given grade when dipped into an electrolyte behaves differently beneath and above the surface of the electrolyte. Thus, graphitized carbon dipping into an electrolyte of relatively high HF content, e. g., $KF \cdot 1.8HF$ at 100° C., swells in the gas space above the electrolyte so much that the effect can be noted visually. This, of course, tends to cause breakage at the electrolyte level and wherever the carbon is confined by the electrical contacts. The graphite probably also swells beneath the surface of the electrolyte. In any case, if it does not break above the electrolyte, it quickly disintegrates beneath the surface. However, notwithstanding the fact that cells using the $KHF_2$ electrolyte normally operate at high temperature, e. g., 235° C., the same graphitized carbon appears to last indefinitely where completely immersed in this electrolyte and also in the gas space above it, provided it does not become mechanically broken at the electrical contacts. Ungraphitized carbon, unless it should become mechanically broken at the electrical contacts, appears to last indefinitely in electrolyte of $KF \cdot 1.8$ to $2HF$. It is believed that there is some swelling of the ungraphitized carbon, though not so much as that of graphitized carbon under the same conditions. Also, it is found that ungraphitized carbon is notably hardened during its use in a fluorine cell.

Breakage at the electrical contacts may be caused by the swelling of the anode just described or from other causes, such as the following: where metal, such as iron or copper, makes contact with the anode, if fluorine or electrolyte is allowed to penetrate between the surfaces of contact the metal becomes quickly coated with the non-conducting film referred to above. This results in high electrical resistance and local heating. If electrolyte be present, the HF is driven out of it by the heat until only KF is left. Eventually this insulates the joint completely; but in the meantime it exerts terrific pressure between the surfaces and is liable to cause breakage of the anode either from mechanical pressure or from high temperature or both.

When carbon or graphite anodes are used, more or less difficulty may be experienced from the phenomena known as "polarization" and "anode effect." It is known that the former is due in large measure to moisture in the electrolyte and the latter to gas films forming upon the surface of the anode. However, with anhydrous electrolyte, effective circulation and good electrical contact, polarization and anode effect do not constitute serious difficulties, even though the anodes are of carbon, graphitized or ungraphitized, particularly at current densities below 100 amperes per square foot, and such anodes are therefore often preferred, on account of their relative cheapness.

It has been stated above that iron and copper become coated with protective films and are therefore practicable materials from which to construct certain parts of hydrogen-fluorine cells. Neither of these metals, when anodic, will last long in the high melting electrolyte, such as $KHF_2$, although copper is superior to iron under these conditions. However, with the low melting electrolyte, such as $KF \cdot 1.8HF$, iron is quite practicable, especially for the cathode, main cell body and wire screen "diaphragms," which are used to keep the hydrogen and fluorine from recombining, which they will do instantly and explosively if allowed to come together.

Another problem in the design of electrolytic hydrogen-fluorine cells is the sealing of the openings through which the electrical conductors enter the cell and insulation of these conductors from the cell body.

It will therefore be seen that the design of a commercially practicable electrolytic hydrogen-fluorine cell involves problems of materials of construction for the cell body, electrodes and insulators, as well as of securing good circulation and replenishment of the HF, besides the usual practical problems of compactness, accessibility, etc.

In the copending application S. N. 526,634, a novel cell has been disclosed having a plurality of electrolytic units wherein means are provided for removal of the entire anode assembly without disturbing the other construction elements of the cell. This is a novel arrangement for a fluorine cell, where a complicated upper structure is unavoidable due to the necessity of preventing mingling of the fluorine gas formed at the anode with hydrogen formed at the cathode and the necessity of effectively removing these gases from the cell without contact with each other. However, individual anodes cannot readily be removed from the anode assembly without completely breaking down such assembly after removal, nor can the diaphragm assembly between the alternate anodes and cathodes be removed from the cell without disturbing the cathode assembly and other structural features of the cell. It is an object of the present invention to provide an improved electrical cell for production of fluorine from hydrogen fluoride which is compact, durable and efficient and which can be operated on a commercial basis.

It is another object of this invention to provide a new and improved electrolytic cell from the production of fluorine wherein the anode assembly can be integrally removed from the cell without disturbing other structures therein and wherein individual anode members can be removed from the anode assembly without dislocation of other anodes.

It is also an object of the invention to provide a new and improved electrolytic cell for the production of fluorine wherein a novel unitary structure of diaphragm members is provided.

This invention further provides a new electrolytic cell for fluorine production wherein the diaphragm assembly can be integrally removed from the cell structure without disturbing the cathode assembly. Other advantages and objects of the invention will be apparent from the following description, taken in conjunction with the accompanying drawings, wherein:

Fig. 3 illustrates an end sectional elevation of the cell, taken along line c—c of Fig. 1;

Figs. 4 and 5 are, respectively, a side elevation and a plan view of the anode assembly;

Figure 1:
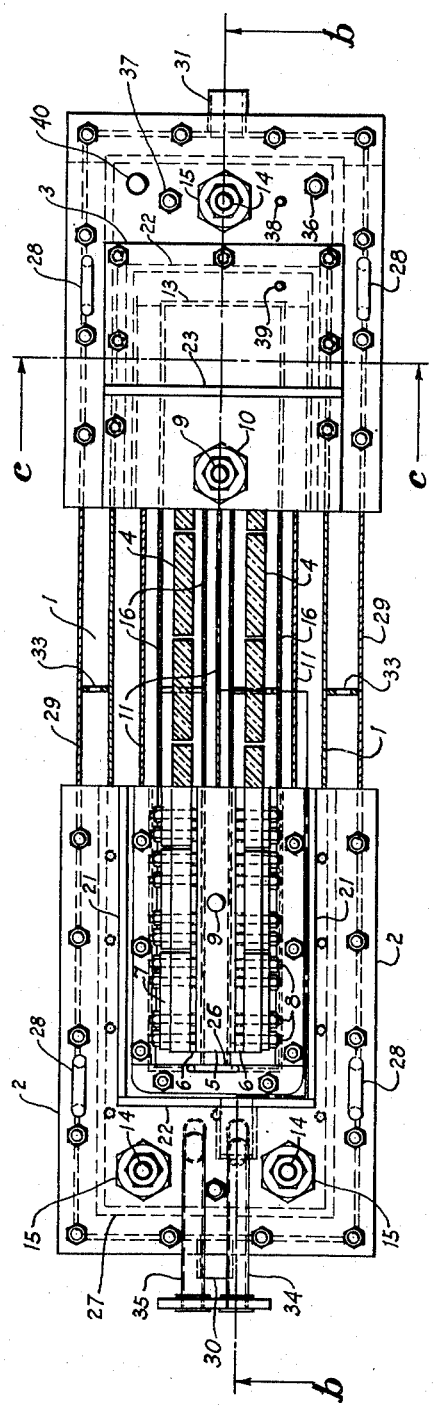
Fig. 1 represents a top plan view of the cell of the invention, partly in section, taken along line a—a of Fig. 2.
Figure 2:
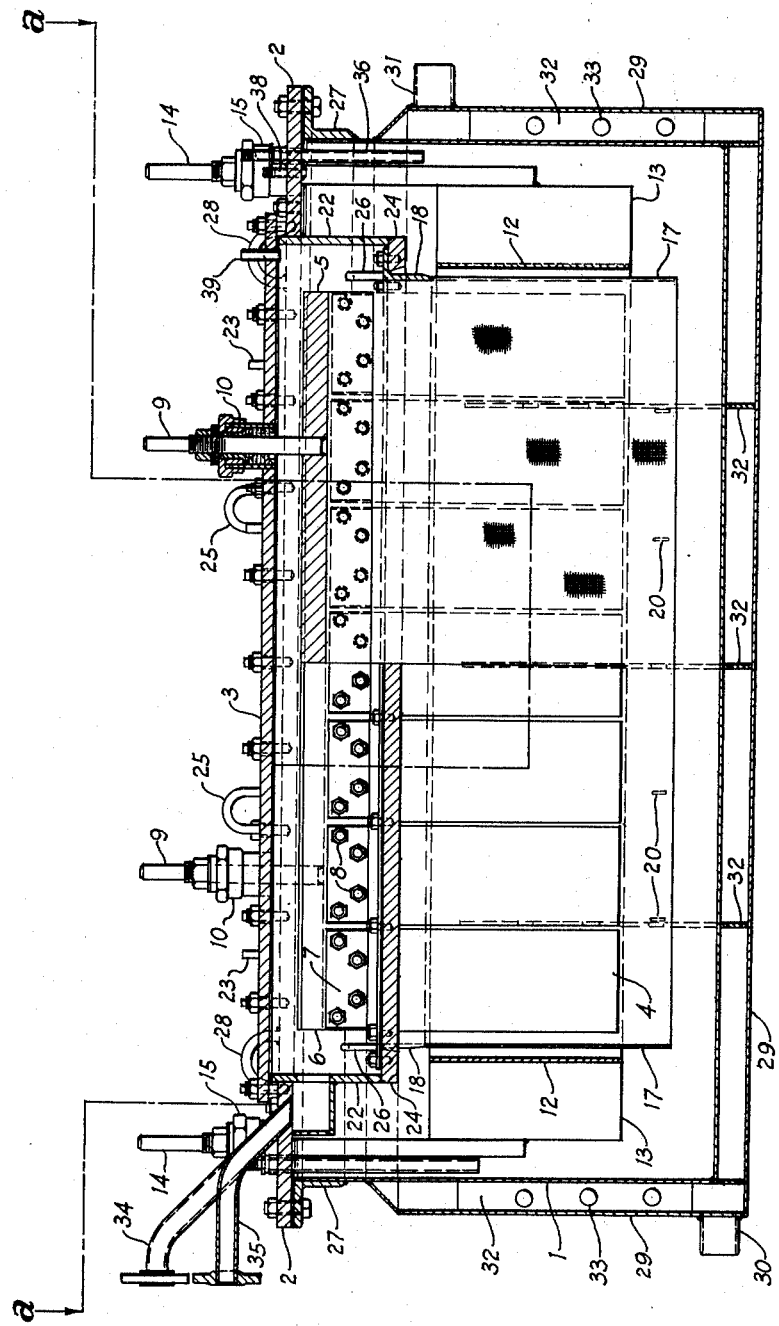
Fig. 2 is a side sectional elevation of the cell, taken along line b—b of Fig. 1.
Figure 7:
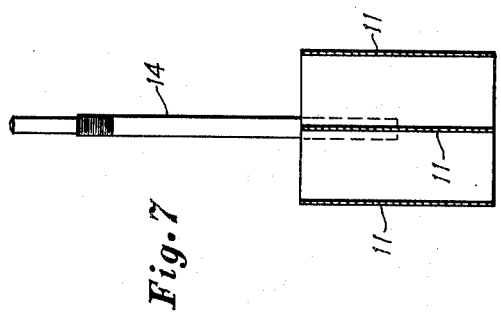
Fig. 7 is an end elevation of the cathode assembly, in section along line d—d of Fig. 6.
Figure 9:
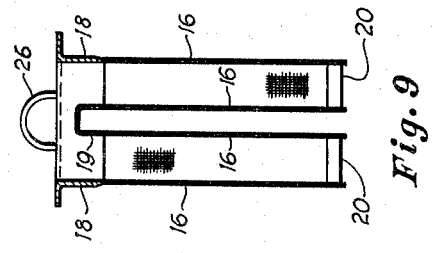
Fig. 9 is an end elevation of the same, in section along line 3—3 of Fig. 8.
Figure 6:
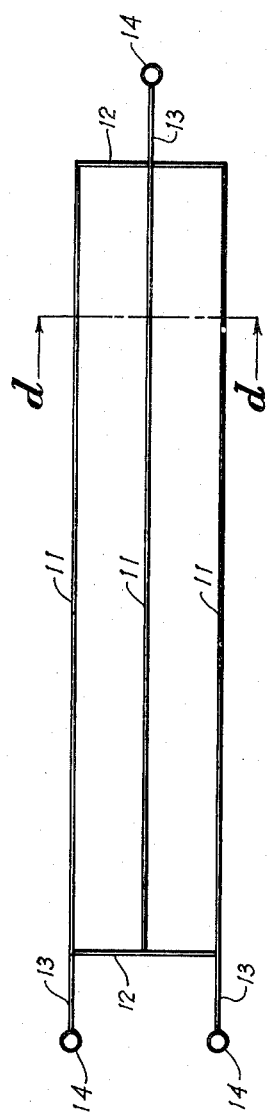
Fig. 6 is a plan view of the cathode assembly by itself.
Figure 8:
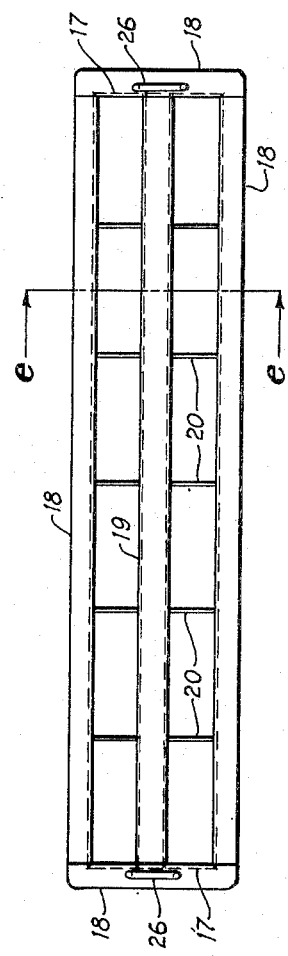
Fig. 8 is a plan view of the diaphragm screen assembly by itself.

According to the present invention, an electrolytic cell comprising a tank for holding a molten electrolyte is provided. This tank has a gas-retaining cover having an opening therein communicating with a well within the tank. Within this well there are a plurality of series of parallel, flat anodic electrodes aligned in the direction of their widths, and the tank also contains a plurality of series of cathodic electrodes spaced from and alternating with the several series of anodes. The anodes are supported by horizontal bars having dependent fins to which said anodes are attached. The horizontal bars are themselves supported by conductors which are fixed but releasably mounted upon a supplemental inner cover which makes a gas-tight junction with the opening communicating with the well in the tank. The unbolting and removal of this inner cover also removes the entire anode assembly, and it is then very easy to unbolt the individual anodes from the fins.

The cell also comprises a diaphragm screen structure of woven wire which is adapted for completely surrounding the anodes and for separating them from the cathodes. This diaphragm assembly is mounted on a frame and is suspended in the well from a seat therein below the inner cover. The diaphragm assembly is so positioned that, after the inner cover and anodes are removed, the diaphragm assembly may be integrally removed from the well without disturbing the cathode assembly.

Referring now to the several figures in the drawings, the electrolytic cell comprises a tank 1, a cover structure comprising an outer cell cover 2 and an inner cover 3, an anode assembly 4, 5, 6, 7, 8 and 9, a cathode assembly 11, 12, 13 and 14, a diaphragm assembly 16, 17, 18, 19 and 20, and insulators 10 and 15.

Tank 1, covers 2 and 3, elements 4, 5, 6 and 7 of the anode structure, and elements 11 and 12 of the diaphragm structure may be of copper or iron, by which terms it is intended to include commercial steels, Monel metal or other suitable metals, depending upon the range of hydrogen fluoride content in the electrolyte, and the corresponding temperature range at which it is intended to operate the cell, the iron being in general preferred in the low temperature range, that is about 90° to 100° C., and copper in the high temperature range, that is about 235° to about 250° C.

While the anodes 4 may be of nickel or carbon, which may be graphitized or ungraphitized depending upon the electrolyte to be used, carbon anodes are preferred because of their cheapness and longer life.

Referring to Fig. 3, it will be seen that anodes 4 and cathodes 11 alternate, with diaphragm 16 lying between. The diaphragm screens are of woven wire. Their function is to permit passage of ions between electrodes, while preventing mingling of the fluorine liberated in one side with the hydrogen liberated in the other.

Referring to Figs. 3, 4 and 5 it will be seen that the anodes 4 are in two rows of seven each. They are supported by a heavy horizontal bar 5, which has depending from it and along each of its sides a fin 6. These fins are machined on their outer faces. The upper ends of the anodes are likewise machined, and the machined surfaces of the anodes are clamped against the machined faces of fins 6 by clamp plates 7 and bolts 8. Bar 5 is supported by conductors 9, which extend outwardly of the cell through insulators 10, which are mounted upon cover plate 3. Insulators 10 also serve as stuffing boxes to prevent escape of fluorine generated upon the anodes.

Referring to Figures 2, 3, 6 and 7:

It will be seen that the cathode assembly consists of three cathode side plates 11, and two cathode end plates 12 joining plates 11 together at their ends, the entire structure being supported by fins 13, which in turn are supported by conductors 14. Conductors 14, of which there are three (see Figure 6), extend outwardly of the cell through insulators 15. Insulators 15 also serve as stuffing boxes to retain the hydrogen which is liberated upon the cathode.

Referring to Figures 2, 3, 8 and 9:

It will be seen that the diaphragm screen structure consists of four side curtains 16, joined together in pairs by end curtains 17, all of woven wire screen. This wire screen structure is supported by angle frame 18. This consists of two side members and two end members welded at the corners, with one leg vertical and the other horizontal, the horizontal leg lying in a flat plane. Midway of the end members, inverted channel 19 is let in through the vertical legs, dividing the angle frame into two rectangular open squares. The two depending edges of channel 19 terminate in the same plane as that of the lower edges of vertical legs 18, forming therewith two rectangular enclosures. The upper edge of wire screens 16 and 17 are welded to the lower edges of angle frame 18 and channel 19, the hole forming a unitary diaphragm screen structure adapted to slip between the three side plates and inside the two end plates of the cathode assembly and between the two rows of anode blades. The lower edges of the diaphragm screen extend below the anode blades and are spaced by spreaders 20.

The anode and diaphragm screen assemblies enter the cell through a rectangular opening in cover 2. This opening is lined on each of its four sides by vertical plates 21 and 22, forming a well extending downwardly into the cell through cover 2. Plates 21, 22 extend a short distance above cover 2, forming a seat against which plate 3 is bolted, with a gasket between, as shown. Plate 3 is stiffened by ribs of which one is shown at 23. The lower edge of the well formed by plates 21, 22 has welded around it heavy plates 24, which extend inwardly to form a rim serving as a seat for the flat horizontal leg of angle frame 18. The diaphragm screen structure may therefore be lifted out through the well, by removing cover plate 3 and the anode assembly. For this purpose, lifting bails 25 and 26 are provided.

Tank 1 is provided with an angle frame 27 around its upper rim, the horizontal legs of which form a flat surface, against which cover 2 is bolted, with a gasket between, as shown. Lifting bails 28 are provided for convenience in lifting cover 2. Tank 1 is also provided with a jacket 29 for cooling water, which may be circulated therethrough by means of pipe connections 30, 31. Jacket 29 is stiffened by ribs 32, through which holes 33 are drilled to facilitate circulation.

The element denoted by reference character 36 is a pipe adapted for introduction of hydrogen fluoride into the molten electrolyte. The cell is also provided with a thermometer well 37, gas sampling pipes 38 and 39, and an opening 40 adapted for use in sampling the electrolyte.

The cell will now be described with reference to a normal operation thereof:

Tank 1 is filled to about the level of the lowest edges of clamp plates 7 with molten potassium fluoride having dissolved therein hydrogen fluoride in the approximate proportion represented by the formulae $KHF_2$ or $KF \cdot 2HF$, depending upon whether the cell is to operate at the high temperature range (235° to 250° C.) or at the low temperature range (90° to 110° C.). Current is then supplied through conductors 9 and 14. Fluorine is evolved upon the anodes and finds its way into the space beneath cover plate 3, whence it is withdrawn through pipe 34. Hydrogen is evolved upon the cathode and collects in the space beneath cover 2, whence it is withdrawn through pipe 35. Channel 19 serves to deliver into the space beneath cover 2 the hydrogen evolved beneath the central plate 11 of the cathode. The hydrogen fluoride of the electrolyte is replenished intermittently or continuously through pipe 36 (see Figs. 1 and 3).

It will be noted that in this cell the anode assembly is removable without disturbing the diaphragm or cathode assemblies, and that the diaphragm assembly is removable without disturbing the cathode assembly; also that when the anode assembly is removed, any individual anode may be removed without disturbing the others. This is of great practical importance, because, as above stated, the anodes are subject to breakage at or near clamp plates 7. It is also of practical importance to be able to remove the diaphragm assembly without disturbing the cathode, as the diaphragm has a limited life, whereas the cathode lasts indefinitely.

Although the present invention has been described with respect to an illustrative embodiment, it will be appreciated that variations and modifications may be made therein and that equivalents may be substituted therefor without departing from the principles and true spirit of the invention. Such variations and modifications are within the scope of the present specification and within the purview of the appended claims.

I claim:

1. An electrolytic cell for production of hydrogen and fluorine from a molten, substantially anhydrous electrolyte consisting of hydrogen fluoride absorbed in alkali metal fluoride which comprises a tank, a gas and liquid retaining first cover therefor having an opening therein communicating with a well within the tank, a well cover making a gas-tight closure with said opening, a plurality of parallel flat anodic electrodes removably suspended from said well cover within said well, a frame releasably affixed within the well and encompassing the upper portions of said anodic electrodes, said frame having woven wire diaphragms suspended therefrom surrounding and depending below said anodic electrodes, a plurality of parallel flat cathodic electrodes spaced from and alternating with said anodic electrodes and separated therefrom by said diaphragms, electrical conductors extending through said well cover and conductively connected to and supporting said anodic electrodes, electrical conductors extending through said first cover and conductively connected to and supporting said cathodic electrodes, means for insulating said conductors from said covers and forming gas-tight closures between said conductors and said covers, and means for collecting the gases evolved upon said anodic and cathodic electrodes respectively in separate chambers, said tank having outlets therein for separately delivering said gases from said chambers.

2. An electrolytic cell for production of hydrogen and fluorine from a molten, substantially anhydrous electrolyte consisting of hydrogen fluoride absorbed in alkali metal fluoride which comprises a tank, a gas and liquid retaining first cover therefor having an opening therein communicating with a well within the tank, a well cover making a gas-tight closure with said opening, a plurality of substantially horizontal conducting bars having fins attached thereto, a plurality of series of parallel flat anodic electrodes suspended within said well and aligned in the direction of their widths, means for individually clamping said anodic electrodes to said fins, a frame releasably affixed within the well and encompassing the upper portions of said anodic electrodes, said frame having woven wire diaphragms suspended therefrom surrounding and depending below said anodic electrodes, a plurality of series of parallel flat cathodic electrodes spaced from and alternating with said anodic electrodes and separated therefrom by said diaphragms, electrical conductors extending through said well cover and conductively connected to and supporting said horizontal conducting bars, electrical conductors extending through said first cover and conductively connected to and supporting said cathodic electrodes, means for insulating said conductors from said covers and forming gas-tight closures between said conductors and said covers, and means for collecting the gases evolved upon said anodic and cathodic electrodes respectively in separate chambers, said tank having outlets therein for separately delivering said gases from said chambers.

SIDNEY G. OSBORNE.

REFERENCES CITED

The following references are of record in the file of this patent:

UNITED STATES PATENTS

| Number | Name | Date |
|---|---|---|
| 1,346,849 | Shaw | July 20, 1920 |
| 1,720,995 | Buck | July 16, 1929 |
| 2,034,458 | Calcott | Mar. 17, 1936 |
| 2,361,974 | Smith | Nov. 7, 1944 |